(12) United States Patent
Tian et al.

(10) Patent No.: US 11,899,398 B1
(45) Date of Patent: Feb. 13, 2024

(54) COLLAPSIBLE PYRAMID HOLOGRAPHIC PROJECTION IMAGER AND PACKAGING BOX INCLUDING SAME

(71) Applicant: CHINA TOBACCO YUNNAN INDUSTRIAL CO., LTD, Kunming (CN)

(72) Inventors: Yuan Tian, Kunming (CN); Xi Yang, Kunming (CN); Yuzhu Chen, Kunming (CN); Fangrui Chen, Kunming (CN); Ying Wu, Kunming (CN); Yuehang Hu, Kunming (CN); Ziye Pei, Kunming (CN); Zhijiang Yin, Kunming (CN); Hao Wang, Kunming (CN); Xuefeng He, Kunming (CN)

(73) Assignee: CHINA TOBACCO YUNNAN INDUSTRIAL CO., LTD, Kunming (CN)

(*) Notice: Subject to any disclaimer, the term of this patent is extended or adjusted under 35 U.S.C. 154(b) by 0 days.

(21) Appl. No.: 18/274,492

(22) PCT Filed: Nov. 2, 2021

(86) PCT No.: PCT/CN2021/128256
§ 371 (c)(1),
(2) Date: Jul. 27, 2023

(87) PCT Pub. No.: WO2023/045035
PCT Pub. Date: Mar. 30, 2023

(30) Foreign Application Priority Data

Sep. 23, 2021 (CN) .......................... 202111110469.7

(51) Int. Cl.
*G03H 1/22* (2006.01)
*B65D 85/10* (2006.01)
*G03H 1/00* (2006.01)

(52) U.S. Cl.
CPC ......... *G03H 1/0005* (2013.01); *G03H 1/2202* (2013.01); *B65D 85/1081* (2013.01);
(Continued)

(58) Field of Classification Search
None
See application file for complete search history.

(56) References Cited

U.S. PATENT DOCUMENTS

| 10,642,220 B2 * | 5/2020 | Zhang .................... G02B 27/04 |
| 2015/0338674 A1 | 11/2015 | Cornford |
| 2022/0308525 A1 * | 9/2022 | Kim ...................... H01F 7/0236 |

FOREIGN PATENT DOCUMENTS

| CN | 106842879 A | 6/2017 |
| CN | 206773406 U | 12/2017 |

(Continued)

*Primary Examiner* — Derek S. Chapel
(74) *Attorney, Agent, or Firm* — Bayramoglu Law Offices LLC

(57) ABSTRACT

A collapsible pyramid holographic projection imager includes a pyramid imaging member and a bottom fixing member, where the pyramid imaging member includes two support plates and a holographic projection film; a middle of the support plate is shaped as a crisscross framework; the holographic projection film is fixed between the two support plates; four pre-cuts are formed in the bottom fixing member; in response to a collapsed state of the collapsible pyramid holographic projection imager, the pyramid imaging member and the bottom fixing member are placed independently in a sheet manner; and in response to an expanded state of the collapsible pyramid holographic projection imager, the collapsible pyramid holographic projection imager assists an image generation device, and a video or an image played by the image generation device is projected to the collapsible pyramid holographic projection imager to form a three-dimensional (3D) image.

16 Claims, 9 Drawing Sheets

(52) U.S. Cl.
CPC . *G03H 2001/0055* (2013.01); *G03H 2210/30* (2013.01); *G03H 2227/05* (2013.01)

(56) References Cited

FOREIGN PATENT DOCUMENTS

| | | |
|---|---|---|
| CN | 207081938 U | 3/2018 |
| CN | 210634897 U | 5/2020 |
| CN | 211732206 U | 10/2020 |
| CN | 113716222 A | 11/2021 |

\* cited by examiner

COLLAPSIBLE PYRAMID HOLOGRAPHIC PROJECTION IMAGER AND PACKAGING BOX INCLUDING SAME

CROSS REFERENCE TO THE RELATED APPLICATIONS

This application is the national phase entry of International Application No. PCT/CN2021/128256, filed on Nov. 2, 2021, which is based upon and claims priority to Chinese Patent Application No. 202111110469.7, filed on Sep. 23, 2021, the entire contents of which are incorporated herein by reference.

TECHNICAL FIELD

The present disclosure relates to the technical field of packaging boxes, particularly to the technical field of cigarette packaging cartons, and more particularly to a collapsible pyramid holographic projection imager and a packaging box including the same.

BACKGROUND

From factory production to sales of cigarette products, packaging boxes are essential, and a large number of manual cigarette packaging cartons are used. With the improvement of living standards, higher requirements are imposed on product packages, and more attention is paid to shapes, structures and functions of the product packages. Exquisite packages not only can make products more magnificent and attractive, but also can increase the enjoyment in use. When buying goods, consumers want to get exquisite packages apart from the desirable quality. Particularly, consumers are more demanding on gift packaging boxes.

In addition to packaging and protecting cigarette products, existing cigarette packaging boxes further display the good side of the cigarette product to attract consumers. The conventional manual cigarette packaging cartons are advertised with a two-dimensional (2D) printed pattern. Nevertheless, these packages are not attractive to the consumers, and cannot be recognized easily over the counter.

Besides, the packaging boxes for jewelries, watches, mobile phones, tablet computers and other electronic products are also made attractive and highly recognizable by designing aesthetically-pleasing shapes or patterns.

With gradual application of a naked-eye three-dimensional (3D) technology, many advertisers keep their eyes on the resulting positive effect. Until now, there has not been a solution to apply the naked-eye 3D technology to the cigarette packaging cartons.

SUMMARY

An objective of the present disclosure is to provide a collapsible pyramid holographic projection imager. In response to a collapsed state of the collapsible pyramid holographic projection imager, the pyramid imaging member 32 and the bottom fixing member 31 are placed independently in a sheet manner. In response to an expanded state of the collapsible pyramid holographic projection imager, the collapsible pyramid holographic projection imager assists an image generation device, and a video or an image played by the image generation device is projected to the collapsible pyramid holographic projection imager 3 to form a 3D image. The collapsible pyramid holographic projection imager can be expanded for imaging, and can also be collapsed for storage and for portability. The packaging box including the collapsible pyramid holographic projection imager of the present disclosure is structurally novel, with a strong display effect.

More particularly, an objective of the present disclosure is to provide a simple multi-view naked-eye 3D cigarette packaging carton. A naked-eye 3D technology is applied to the cigarette packaging carton, which makes consumers curious to remember the cigarette product. The simple multi-view naked-eye 3D cigarette packaging carton improves a counter display effect of a cigarette product package, makes the product more enjoyable and interactive, and solves the technical problems that the existing cigarette packaging carton has a single packaging form, and cannot be recognized easily.

In the present disclosure, the cigarette packaging carton refers to a packaging box capable of packaging a plurality of cigarette packets, namely a carton of cigarettes called by the consumers. The cigarette packaging box refers to a packaging box capable of packaging a plurality of cigarettes, namely a packet of cigarettes called by the consumers.

To solve the above technical problems, a first aspect of the present disclosure is to provide a collapsible pyramid holographic projection imager, including a pyramid imaging member 32 and a bottom fixing member 31, where the pyramid imaging member 32 includes two support plates 321 and a holographic projection film 322; a middle of the support plate 321 is shaped as a "crisscross" framework; the holographic projection film 322 is fixed between the two support plates 321; four top-connected projection surfaces 323 are pre-cut on the holographic projection film 322; and tops of the projection surfaces 323 are fixed at an intersection of the "crisscross" framework of the support plate 321;

four pre-cuts 311 are formed in the bottom fixing member 31; and pins corresponding to the pre-cuts 311 are respectively provided on bottoms of the projection surfaces 323;

in response to a collapsed state of the collapsible pyramid holographic projection imager, the pyramid imaging member 32 and the bottom fixing member 31 are placed independently in a sheet manner; and in response to an expanded state of the collapsible pyramid holographic projection imager, the projection surfaces 323 are pushed out from hollow portions of the "crisscross" framework of the support plate 321, and the pins of the projection surfaces 323 are respectively inserted into the corresponding pre-cuts 311, thereby fixing a bottom of the holographic projection film 322; and two adjacent edges of the four projection surfaces 323 are connected sequentially to form a pyramid shape.

A second aspect of the present disclosure provides a packaging box including the collapsible pyramid holographic projection imager in the first aspect of the present disclosure, where when the packaging box is used to package an article, the collapsible pyramid holographic projection imager is in the collapsed state and placed at a certain position; and when the article in the packaging box is taken out, the collapsible pyramid holographic projection imager may be in the expanded state and placed into an article packaging cavity of the packaging box, an image generation device is provided in the packaging box, and a video or an image played by the image generation device is projected to the collapsible pyramid holographic projection imager 3 to form a 3D image.

A third aspect of the present disclosure provides a simple multi-view naked-eye 3D cigarette packaging carton, including a carton body 1, a cover 4, a frame 2, and the collapsible pyramid holographic projection imager 3 in the first aspect of the present disclosure, where the cover 4 is provided on the carton body 1;

the frame 2 is provided in the carton body 1;

a support portion 22 is provided on the frame 2, and a lower portion of the support portion 22 is a cigarette packet accommodating cavity 21;

in response to a stored state of the cigarette packaging carton, the collapsible pyramid holographic projection imager 3 is collapsed and then stored on the support portion 22, and a cigarette packaging carton is stored in the cigarette packet accommodating cavity 21; and in response to a displayed state of the cigarette packaging carton, the cigarette packaging carton is taken out from the cigarette packet accommodating cavity 21; the collapsible pyramid holographic projection imager 3 is taken out from the support portion 22; the collapsible pyramid holographic projection imager 3 is expanded and then placed in the cigarette packet accommodating cavity 21, so as to serve as a 3D imaging body for a display content of the image generation device; the image generation device is provided on the support portion 22; and a video or an image played by the image generation device is projected to the collapsible pyramid holographic projection imager 3 to form a 3D image.

Preferably, the collapsible pyramid holographic projection imager 3 includes a pyramid imaging member 32 and a bottom fixing member 31;

the pyramid imaging member 32 includes two support plates 321 and a holographic projection film 322; a middle of the support plate 321 is shaped as a "crisscross" framework; the holographic projection film 322 is fixed between the two support plates 321; four top-connected projection surfaces 323 are pre-cut on the holographic projection film 322; and tops of the projection surfaces 323 are fixed at an intersection of the "crisscross" framework of the support plate 321;

four pre-cuts 311 are formed in the bottom fixing member 31; and pins corresponding to the pre-cuts 311 are respectively provided on bottoms of the projection surfaces 323; and the projection surfaces 323 are pushed out from hollow portions of the "crisscross" framework of the support plate 321, and the pins of the projection surfaces 323 are respectively inserted into the corresponding pre-cuts 311, thereby fixing a bottom of the holographic projection film 322; and two adjacent edges of the four projection surfaces 323 are connected sequentially to form a pyramid shape.

Preferably, there are two collapsible pyramid holographic projection imagers 3; and correspondingly, there are also two image generation devices.

In the present disclosure, the image generation device includes, but is not limited to, a mobile phone and a tablet computer. The image generation device can be a display device, provided that the display device can be provided on the support portion 22 and can generate an image.

Preferably, in response to the displayed state of the cigarette packaging carton, a first one of the collapsible pyramid holographic projection imagers 3 is fixed by the support portion 22, and suspended in the cigarette packet accommodating cavity 21 in a forward pyramid form; and correspondingly, a first one of the image generation devices is provided on the support portion 22;

a second one of the image generation devices is provided at a bottom of the cigarette packet accommodating cavity 21, and a second one of the collapsible pyramid holographic projection imagers 3 is provided on the second one of the image generation devices in an inverted pyramid form; and bottoms of the two collapsible pyramid holographic projection imagers 3 are opposite to each other.

Preferably, a gap is formed between the bottoms of the two collapsible pyramid holographic projection imagers 3. With the gap, the upper and lower pyramid imagers have clearer imaging and do not affect each other.

Preferably, the carton body 1 includes a front baffle 11, a rear baffle 12, a left baffle 13, and a right baffle 14; the front baffle 11, the rear baffle 12, the left baffle 13, and the right baffle 14 are connected sequentially; longitudinal grooves are respectively formed at four corners of the carton body 1; and four support legs of the frame 2 are configured to be inserted into the grooves for fixing, so as to ensure that each baffle can be stably fixed with the frame, and any baffle can be opened independently.

Preferably, the front baffle 11, the rear baffle 12, the left baffle 13, and the right baffle 14 are configured to be opened independently according to a present environment. In case of strong light, only one baffle can be opened. In case of weak light, the front baffle 11, the rear baffle 12, the left baffle 13, and the right baffle 14 can all be opened.

Preferably, an image is further provided on each of the front baffle 11, the rear baffle 12, the left baffle 13, and the right baffle 14, and the image may be configured to be interacted with the image of the collapsible pyramid holographic projection imager 3.

A fourth aspect of the present disclosure provides a method for operating the simple multi-view naked-eye 3D cigarette packaging carton in the third aspect of the present disclosure, where the simple multi-view naked-eye 3D cigarette packaging carton has the stored state and the displayed state;

in response to the stored state of the cigarette packaging carton, the collapsible pyramid holographic projection imager 3 is collapsed and then stored on the support portion 22, and the cigarette packaging carton is stored in the cigarette packet accommodating cavity 21; and in response to the displayed state of the cigarette packaging carton, the cigarette packaging carton is taken out from the cigarette packet accommodating cavity 21; the collapsible pyramid holographic projection imager 3 is taken out from the support portion 22; the collapsible pyramid holographic projection imager 3 is expanded and then placed in the cigarette packet accommodating cavity 21, so as to serve as the 3D imaging body for the display content of the image generation device; and the image generation device is provided on the support portion 22.

The collapsible pyramid holographic projection imager provided by the present disclosure has the following advantages: In response to a collapsed state of the collapsible pyramid holographic projection imager, the pyramid imaging member 32 and the bottom fixing member 31 are placed independently in a sheet manner. In response to an expanded state of the collapsible pyramid holographic projection imager, the collapsible pyramid holographic projection imager assists an image generation device, and a video or an image played by the image generation device is projected to the collapsible pyramid holographic projection imager 3 to form a 3D image. The collapsible pyramid holographic projection imager can be expanded for imaging, and can also be collapsed for storage and for portability.

The simple multi-view naked-eye 3D cigarette packaging carton provided by the present disclosure has the following advantages over the prior art:

1. The simple multi-view naked-eye 3D cigarette packaging carton provided by the present disclosure not only can package a cigarette product, but also has a display function. A cigarette packet can be placed in the cigarette packet accommodating cavity of the carton body. After the cigarette packet is taken out, a pyramid imager assembly can be expanded to form two symmetrical pyramid imagers. A video or an image played by an image generation device is projected to the pyramid imager to form a 3D image. Therefore, the simple multi-view naked-eye 3D cigarette packaging carton has a remarkable naked-eye 3D effect, can be attractive to consumers, improves an advertisement effect of the product and a counter display effect of the cigarette product package, and makes the product more enjoyable and interactive.

2. According to the simple multi-view naked-eye 3D cigarette packaging carton provided by the present disclosure, the front baffle 11, the rear baffle 12, the left baffle 13, and the right baffle 14 are configured to be opened independently according to a present environment. In case of strong light, only one baffle can be opened. In case of weak light, the front baffle 11, the rear baffle 12, the left baffle 13, and the right baffle 14 can all be opened. Further, an image is further provided on each of the front baffle 11, the rear baffle 12, the left baffle 13, and the right baffle 14, and the image can be configured to be interacted with the image of the collapsible pyramid holographic projection imager 3.

3. The simple multi-view naked-eye 3D cigarette packaging carton provided by the present disclosure has a 3D display function when taken as a gift package. The product package is novel, small in size and convenient to carry, and can make people curious to remember the product.

In the figures: 1—carton body, 11—front baffle, 12—rear baffle, 13—left baffle, 14—right baffle, 2—frame, 21—cigarette packet accommodating cavity, 22—support portion, 3—pyramid imager assembly, 31—bottom fixing member, 311—pre-cut, 32—pyramid imaging member, 321—support plate, 322—holographic projection film, 323—projection surface, and 4—cover.

DETAILED DESCRIPTION OF THE EMBODIMENTS

In order to better understand the objective, structure and function of the present disclosure, the present disclosure will be described in further detail below.

Figure 1:
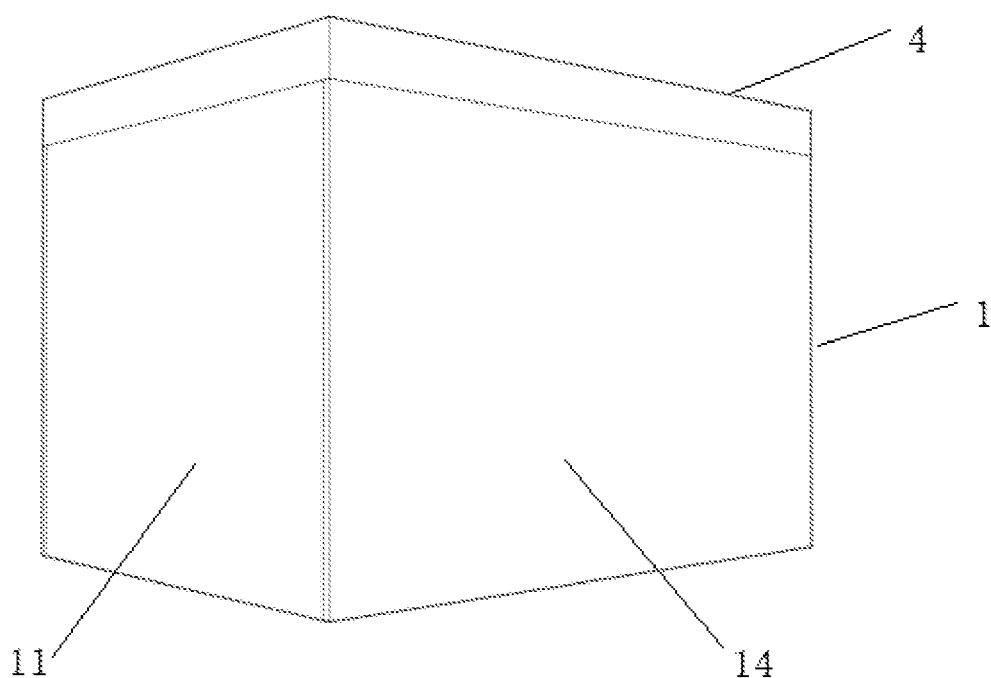
FIG. 1 is a schematic view illustrating a stored state of a simple multi-view naked-eye 3D cigarette packaging carton when a cigarette packet is packaged according to the present disclosure.
Figure 2:
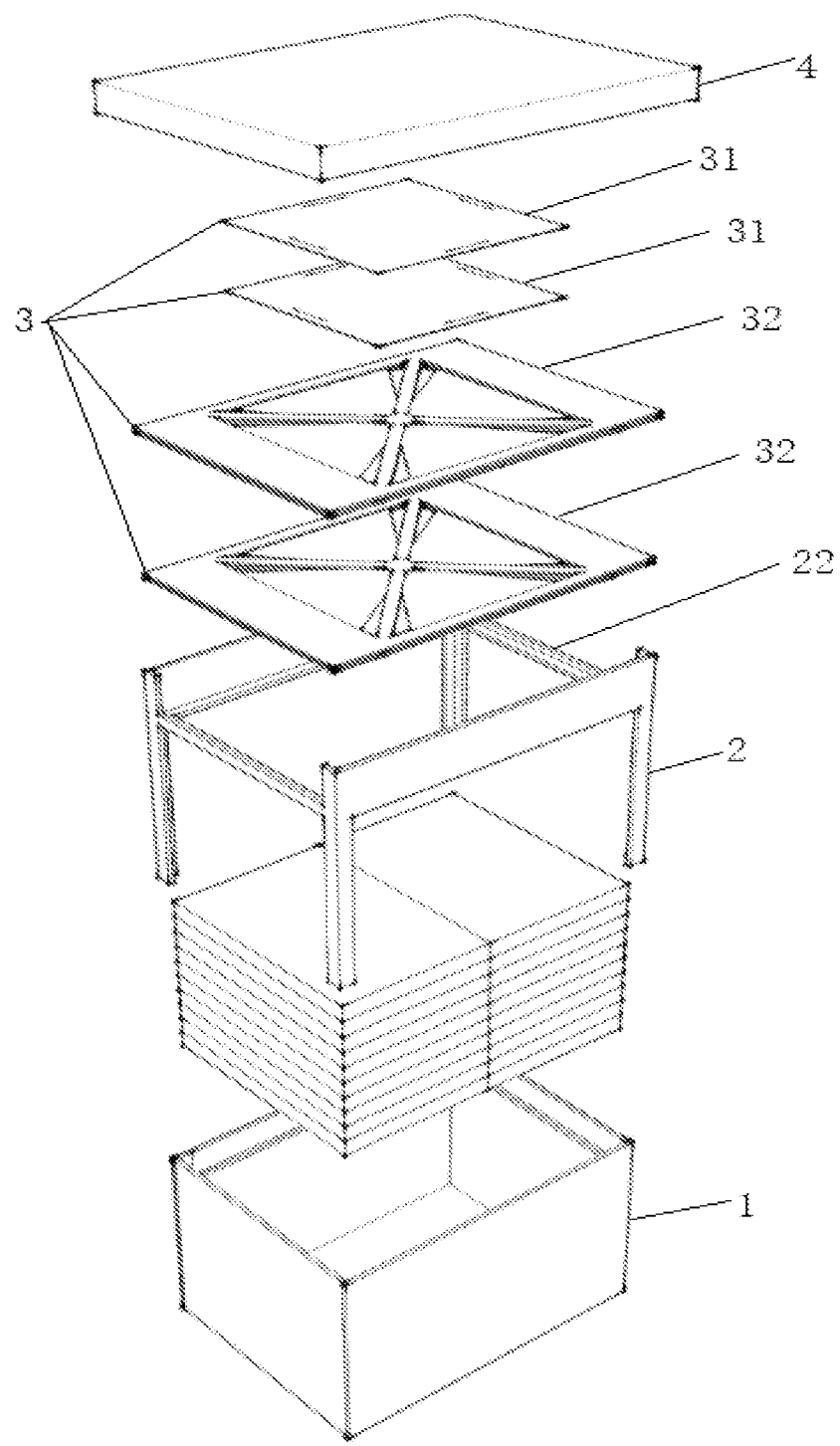
FIG. 2 is a schematic view illustrating an expanded structure of a cigarette packaging carton when a cigarette packaging box is packaged according to the present disclosure.
Figure 3:
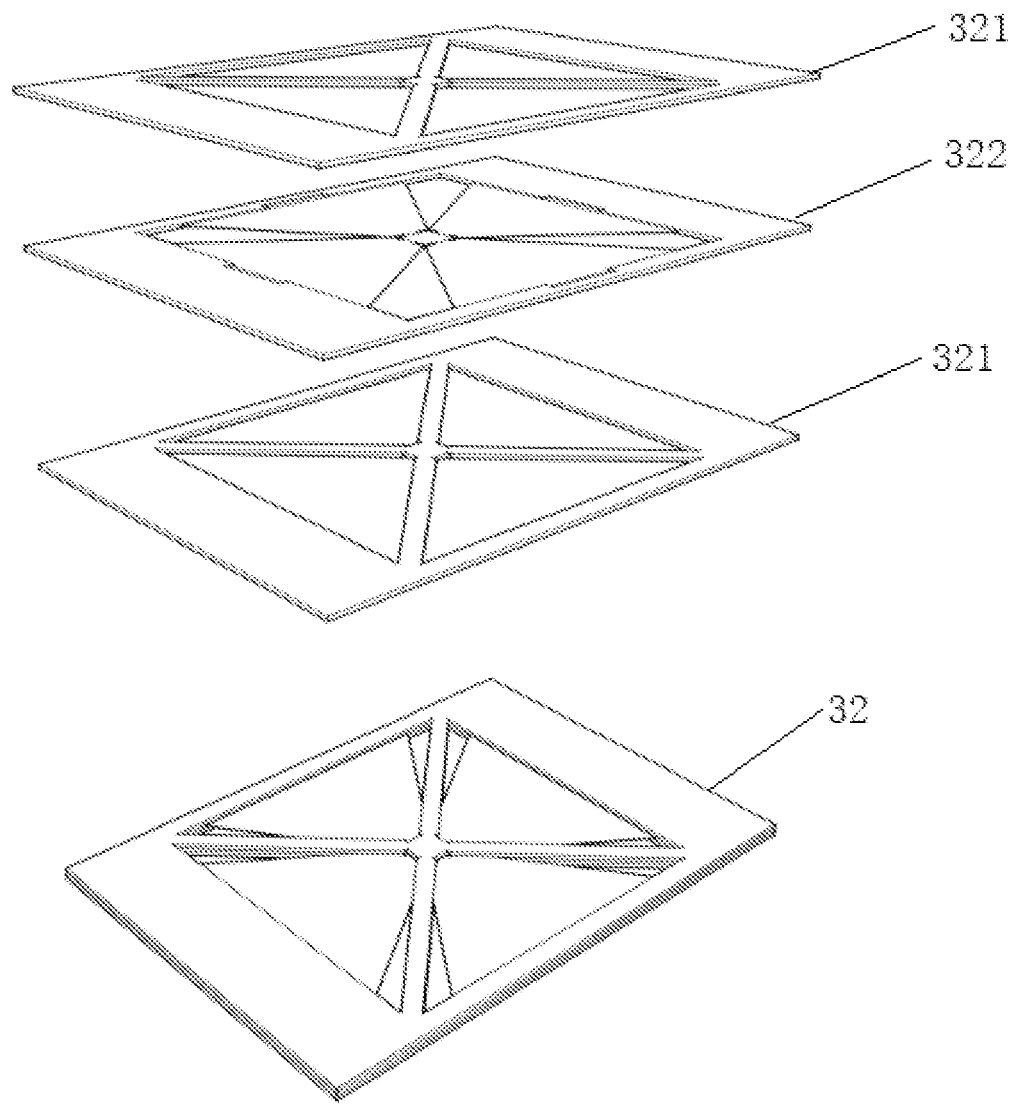
FIG. 3 is a schematic structural view illustrating an expanded state of a pyramid imaging member of a cigarette packaging carton according to the present disclosure.
Figure 4:
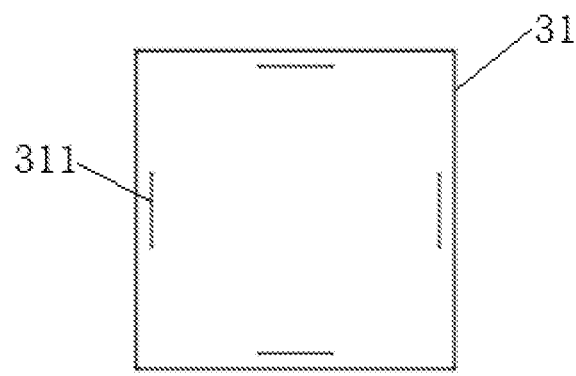
FIG. 4 is a schematic structural view illustrating a bottom fixing member of a cigarette packaging carton according to the present disclosure.
Figure 5:
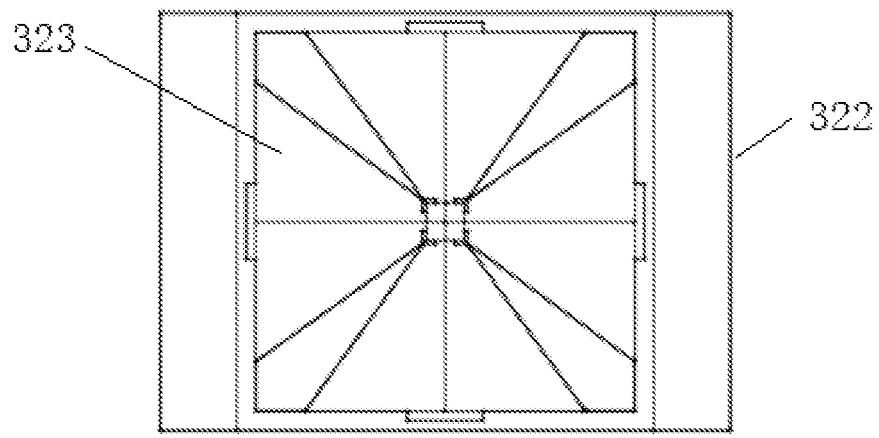
FIG. 5 is a schematic structural view illustrating a holographic projection film of a cigarette packaging carton according to the present disclosure.
Figure 6:
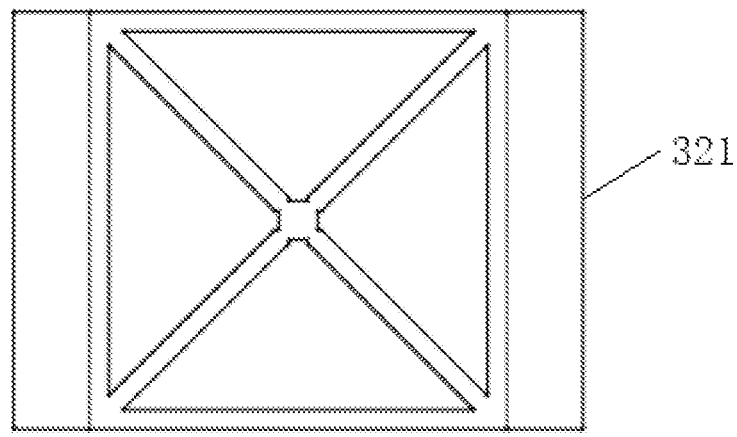
FIG. 6 is a schematic structural view illustrating a support plate of a cigarette packaging carton according to the present disclosure.
Figure 7:
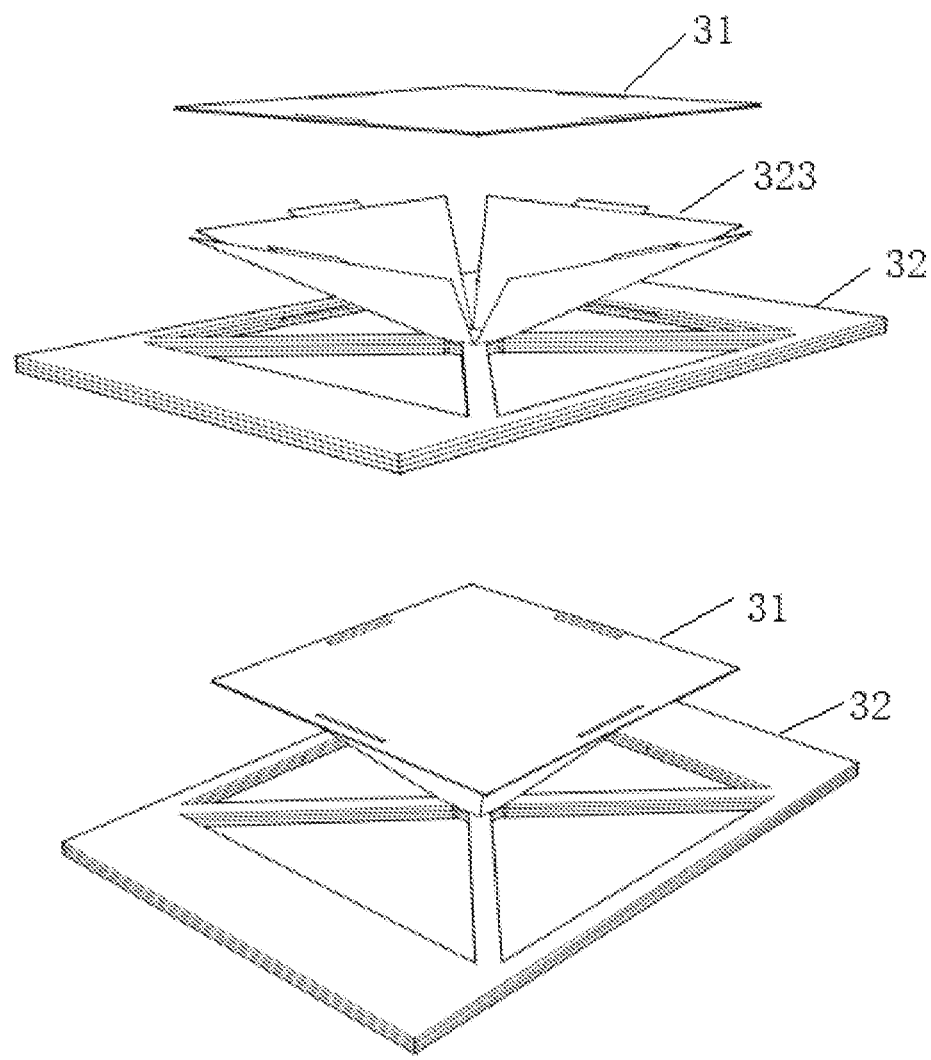
FIG. 7 is a schematic view illustrating a use state in which a pyramid imager assembly of a cigarette packaging carton is expanded according to the present disclosure.
Figure 8:
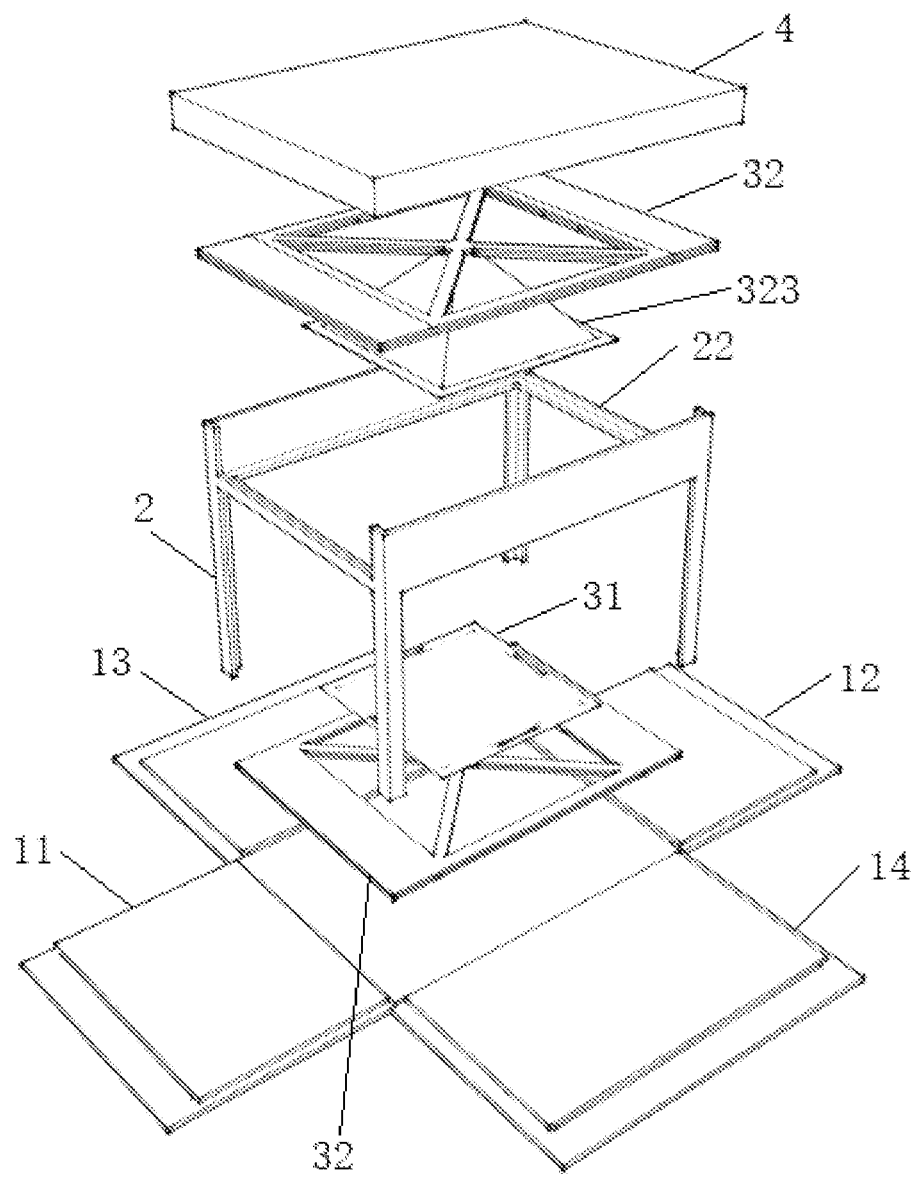
FIG. 8 is a schematic view illustrating a use state in which baffles at a periphery are expanded when a cigarette packaging carton displays a pyramid imager assembly according to the present disclosure.
Figure 9:
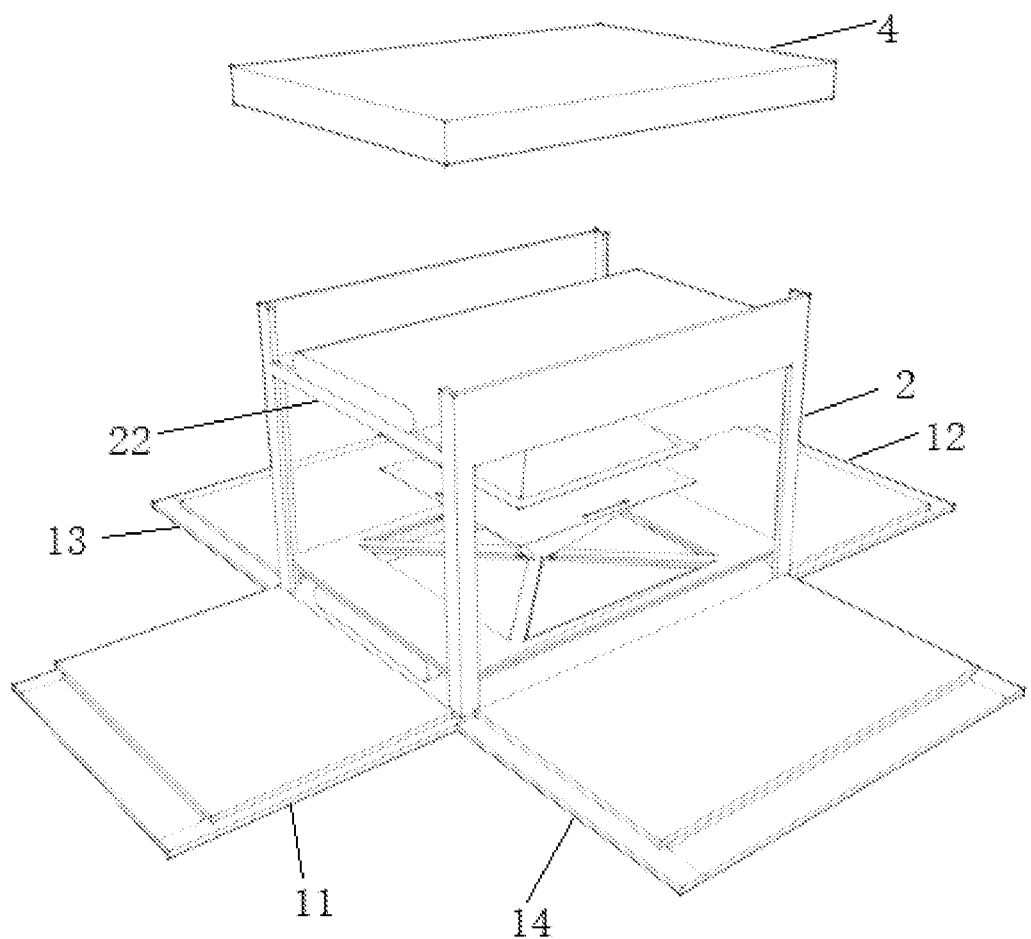
FIG. 9 is a schematic view illustrating that baffles at a periphery are expanded when a cigarette packaging carton displays a pyramid imager assembly according to the present disclosure.
Figure 10:
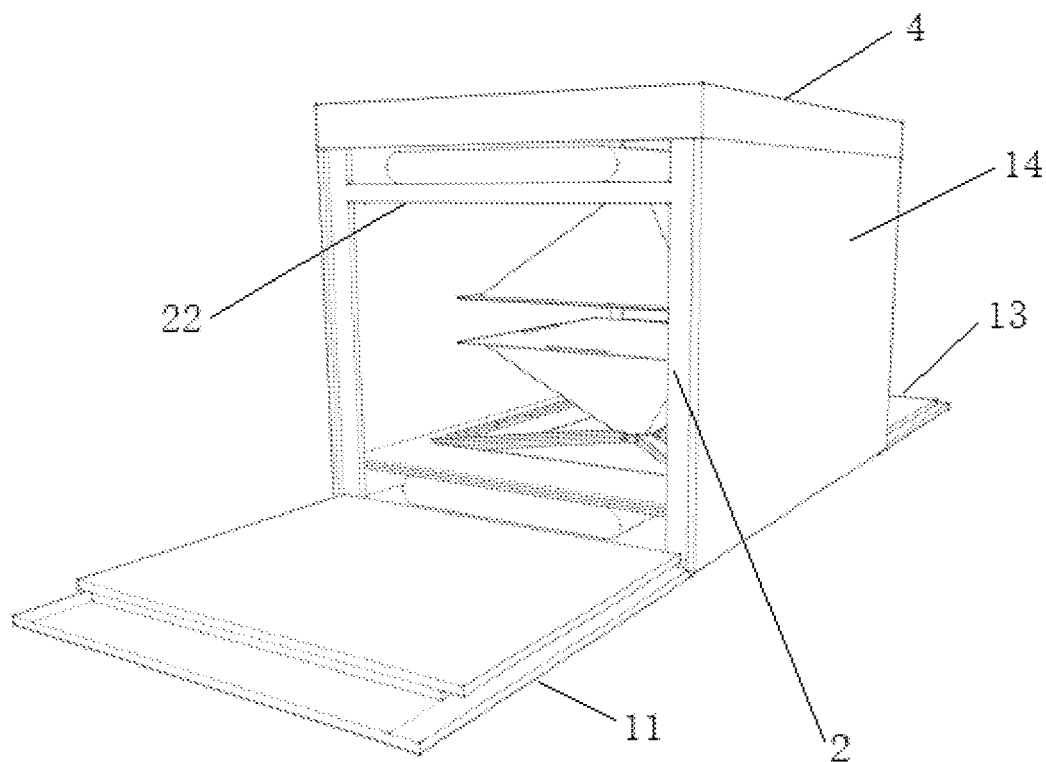
FIG. 10 is a schematic view illustrating that a front baffle and a rear baffle are expanded when a cigarette packaging carton displays a pyramid imager assembly according to the present disclosure.
Figure 11:
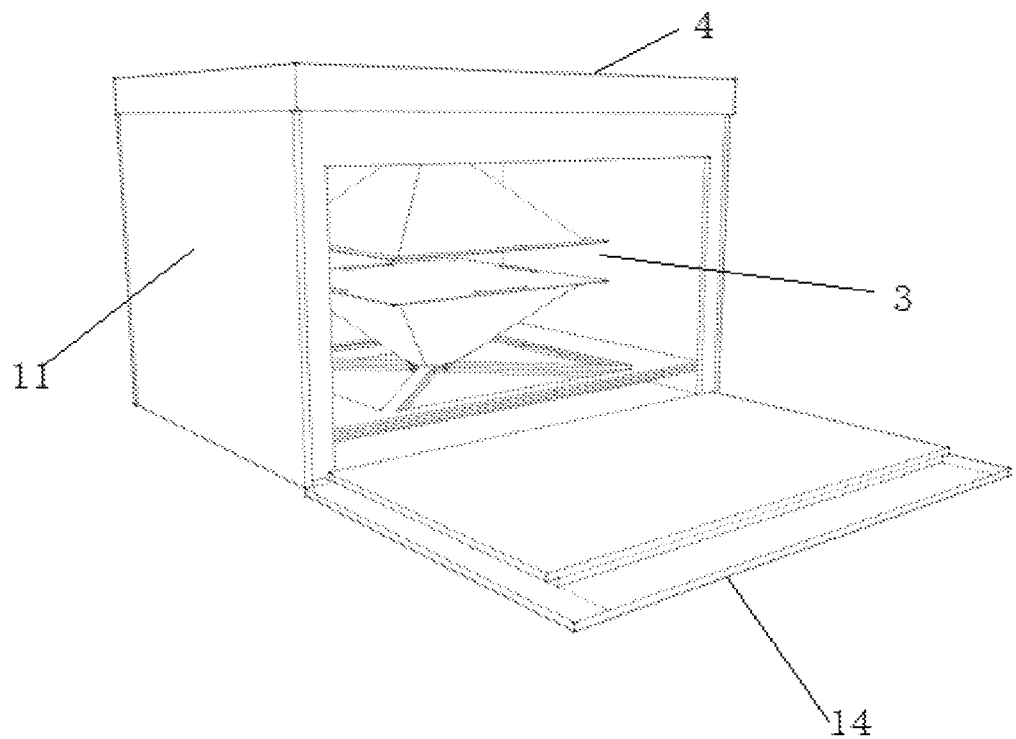
FIG. 11 is a schematic view illustrating that a right baffle is expanded when a cigarette packaging carton displays a pyramid imager assembly according to the present disclosure.
Figure 12:
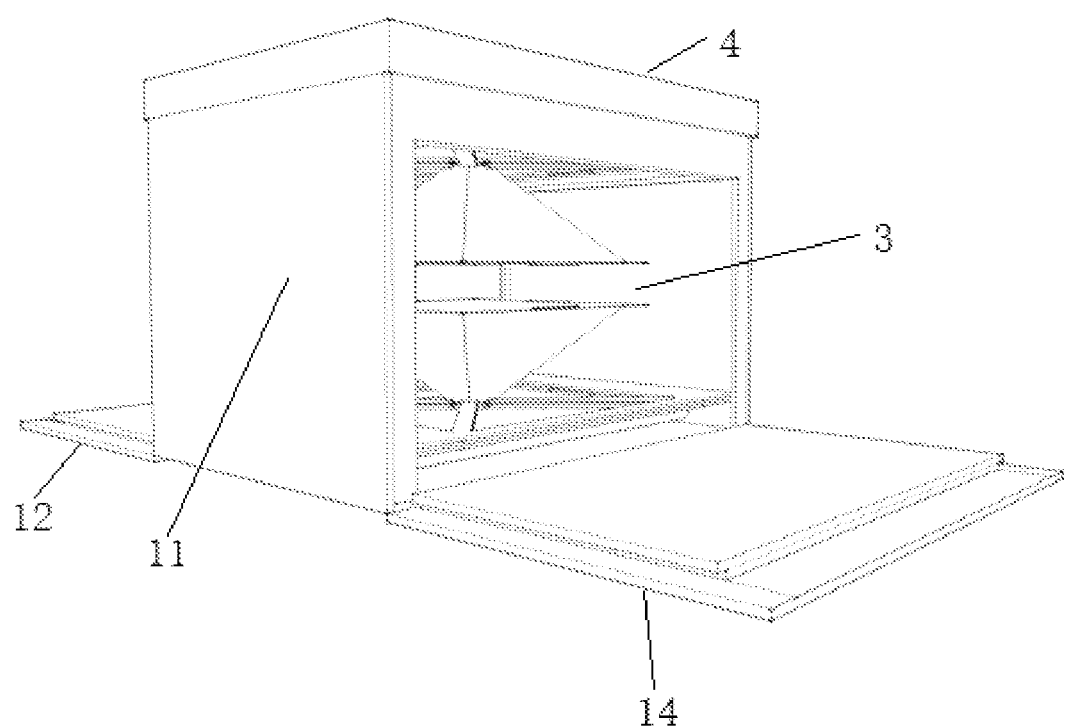
FIG. 12 is a schematic view illustrating that a left baffle and a right baffle are expanded when a cigarette packaging carton displays a pyramid imager assembly according to the present disclosure.

As shown in FIG. 1, the present disclosure provides a simple multi-view naked-eye 3D cigarette packaging carton, including carton body 1, cover 4, frame 2, and collapsible pyramid holographic projection imager 3.

The cover 4 is provided on the carton body 1.

The frame 2 is provided in the carton body 1.

Support portion 22 is provided on the frame 2. A lower portion of the support portion 22 is cigarette packet accommodating cavity 21.

In response to a stored state of the cigarette packaging carton, the collapsible pyramid holographic projection imager 3 is collapsed and then stored on the support portion 22, and a cigarette packaging carton is stored in the cigarette packet accommodating cavity 21.

In response to a displayed state of the cigarette packaging carton, the cigarette packaging carton is taken out from the cigarette packet accommodating cavity 21. The collapsible pyramid holographic projection imager 3 is taken out from the support portion 22. The collapsible pyramid holographic projection imager 3 is expanded and then placed in the cigarette packet accommodating cavity 21, so as to serve as a 3D imaging body for a display content of the image generation device. The image generation device is provided on the support portion 22. A video or an image played by the image generation device is projected to the collapsible pyramid holographic projection imager 3 to form a 3D image.

The collapsible pyramid holographic projection imager 3 includes pyramid imaging member 32 and bottom fixing member 31.

The pyramid imaging member 32 includes two support plates 321 and a holographic projection film 322. A middle of the support plate 321 is shaped as a "crisscross" framework. The holographic projection film 322 is fixed between the two support plates 321. Four top-connected projection surfaces 323 are pre-cut on the holographic projection film 322. Tops of the projection surfaces 323 are fixed at an intersection of the "crisscross" framework of the support plate 321.

Four pre-cuts 311 are formed in the bottom fixing member 31. Pins corresponding to the pre-cuts 311 are respectively provided on bottoms of the projection surfaces 323.

The projection surfaces 323 are pushed out from hollow portions of the "crisscross" framework of the support plate 321, and the pins of the projection surfaces 323 are respectively inserted into the corresponding pre-cuts 311, thereby fixing a bottom of the holographic projection film 322. Two adjacent edges of the four projection surfaces 323 are connected sequentially to form a pyramid shape.

There are two collapsible pyramid holographic projection imagers 3. Correspondingly, there are also two image generation devices.

In response to the displayed state of the cigarette packaging carton, a first one of the collapsible pyramid holographic projection imagers 3 is fixed by the support portion 22, and suspended in the cigarette packet accommodating cavity 21 in a forward pyramid form.

Correspondingly, a first one of the image generation devices is provided on the support portion 22.

A second one of the image generation devices is provided at a bottom of the cigarette packet accommodating cavity 21, and a second one of the collapsible pyramid holographic projection imagers 3 is provided on the second one of the image generation devices in an inverted pyramid form.

Bottoms of the two collapsible pyramid holographic projection imagers 3 are opposite to each other.

A gap is formed between the bottoms of the two collapsible pyramid holographic projection imagers 3.

The carton body 1 includes front baffle 11, rear baffle 12, left baffle 13, and right baffle 14. The front baffle 11, the rear baffle 12, the left baffle 13, and the right baffle 14 are connected sequentially. Longitudinal grooves are respectively formed at four corners of the carton body 1. Four support legs of the frame 2 are configured to be inserted into the grooves for fixing, so as to ensure that each baffle can be stably fixed with the frame, and any baffle can be opened independently.

The front baffle 11, the rear baffle 12, the left baffle 13, and the right baffle 14 are configured to be opened independently according to a present environment. In case of strong light, only one baffle can be opened. In case of weak light, the front baffle 11, the rear baffle 12, the left baffle 13, and the right baffle 14 can all be opened.

An image is further provided on each of the front baffle 11, the rear baffle 12, the left baffle 13, and the right baffle 14. The image may be configured to be interacted with the image of the collapsible pyramid holographic projection imager 3.

The present disclosure provides a method for operating the simple multi-view naked-eye 3D cigarette packaging carton. The simple multi-view naked-eye 3D cigarette packaging carton has the stored state and the displayed state.

In response to the stored state of the cigarette packaging carton, the collapsible pyramid holographic projection imager 3 is collapsed and then stored on the support portion 22, and the cigarette packaging carton is stored in the cigarette packet accommodating cavity 21.

In response to the displayed state of the cigarette packaging carton, the cigarette packaging carton is taken out from the cigarette packet accommodating cavity 21. The collapsible pyramid holographic projection imager 3 is taken out from the support portion 22. The collapsible pyramid holographic projection imager 3 is expanded and then placed in the cigarette packet accommodating cavity 21, so as to serve as the 3D imaging body for the display content of the image generation device. The image generation device is provided on the support portion 22.

The present disclosure is described with reference to the examples, and those skilled in the art should know that various changes or equivalent substitutions can be made to the features and examples of the present disclosure without departing from the spirit and scope of the present disclosure. In addition, under the concept of the present disclosure, these features and examples can be modified to adapt to specific conditions and materials without departing from the spirit and scope of the present disclosure. Therefore, the present disclosure is not limited by the disclosed specific examples, and all examples falling within the scope of the claims of this application should belong to the protection scope of the present disclosure.

What is claimed is:

1. A collapsible pyramid holographic projection imager, comprising a pyramid imaging member and a bottom fixing member, wherein
    the pyramid imaging member comprises two support plates and a holographic projection film; a middle of the support plate is shaped as a crisscross framework; the holographic projection film is fixed between the two support plates;
    four top-connected projection surfaces are pre-cut on the holographic projection film;
    and tops of the projection surfaces are fixed at an intersection of the crisscross framework of the support plate;
    four pre-cuts are formed in the bottom fixing member; and pins corresponding to the pre-cuts are respectively provided on bottoms of the projection surfaces;
    in response to a collapsed state of the collapsible pyramid holographic projection imager, the pyramid imaging member and the bottom fixing member are placed independently in a sheet manner; and
    in response to an expanded state of the collapsible pyramid holographic projection imager, the projection surfaces are pushed out from hollow portions of the crisscross framework of the support plate, and the pins of the projection surfaces are respectively inserted into the corresponding pre-cuts, thereby fixing a bottom of the holographic projection film; and two adjacent edges of the four projection surfaces are connected sequentially to form a pyramid shape.

2. A packaging box comprising the collapsible pyramid holographic projection imager according to claim 1, wherein when the packaging box is used to package an article, the collapsible pyramid holographic projection imager is in the collapsed state and placed at a certain position; and when the article in the packaging box is taken out, the collapsible pyramid holographic projection imager is in the expanded state and placed into an article packaging cavity of the packaging box, an image generation device is provided in the packaging box, and a video or an image played by the image generation device is projected to the collapsible pyramid holographic projection imager to form a three-dimensional image.

3. A simple multi-view naked-eye 3D cigarette packaging carton, comprising a carton body, a cover, a frame, and the collapsible pyramid holographic projection imager according to claim 1, wherein the cover is provided on the carton body;

the frame is provided in the carton body;

a support portion is provided on the frame, and a lower portion of the support portion is a cigarette packet accommodating cavity;

in response to a stored state of the cigarette packaging carton, the collapsible pyramid holographic projection imager is collapsed and then stored on the support portion, and a cigarette packaging carton is stored in the cigarette packet accommodating cavity; and in response to a displayed state of the cigarette packaging carton, the cigarette packaging carton is taken out from the cigarette packet accommodating cavity; the collapsible pyramid holographic projection imager is taken out from the support portion; the collapsible pyramid holographic projection imager is expanded and then placed in the cigarette packet accommodating cavity; an image generation device is provided on the support portion; and a video or an image played by the image generation device is projected to the collapsible pyramid holographic projection imager to form a 3D image.

4. The simple multi-view naked-eye 3D cigarette packaging carton according to claim 3, wherein there are two collapsible pyramid holographic projection imagers; and correspondingly, there are also two image generation devices.

5. The simple multi-view naked-eye 3D cigarette packaging carton according to claim 4, wherein in response to the displayed state of the cigarette packaging carton, a first one of the collapsible pyramid holographic projection imagers is fixed by the support portion, and suspended in the cigarette packet accommodating cavity in a forward pyramid form; and correspondingly, a first one of the image generation devices is provided on the support portion;

a second one of the image generation devices is provided at a bottom of the cigarette packet accommodating cavity, and a second one of the collapsible pyramid holographic projection imagers is provided on the second one of the image generation devices in an inverted pyramid form; and bottoms of the two collapsible pyramid holographic projection imagers are opposite to each other.

6. The simple multi-view naked-eye 3D cigarette packaging carton according to claim 5, wherein a gap is formed between the bottoms of the two collapsible pyramid holographic projection imagers.

7. The simple multi-view naked-eye 3D cigarette packaging carton according to claim 3, wherein the carton body comprises a front baffle, a rear baffle, a left baffle, and a right baffle; wherein the front baffle, the rear baffle, the left baffle, and the right baffle are connected sequentially; longitudinal grooves are respectively formed at four corners of the carton body; and four support legs of the frame are configured to be inserted into the grooves for fixing.

8. The simple multi-view naked-eye 3D cigarette packaging carton according to claim 7, wherein the front baffle, the rear baffle, the left baffle, and the right baffle are configured to be opened independently.

9. The simple multi-view naked-eye 3D cigarette packaging carton according to claim 7, wherein an image is further provided on each of the front baffle, the rear baffle, the left baffle, and the right baffle; and the image is configured to be interacted with the image of the collapsible pyramid holographic projection imager.

10. A method for operating the simple multi-view naked-eye 3D cigarette packaging carton according to claim 3, wherein the simple multi-view naked-eye 3D cigarette packaging carton has the stored state and the displayed state;

in response to the stored state of the cigarette packaging carton, the collapsible pyramid holographic projection imager is collapsed and then stored on the support portion, and the cigarette packaging carton is stored in the cigarette packet accommodating cavity; and in response to the displayed state of the cigarette packaging carton, the cigarette packaging carton is taken out from the cigarette packet accommodating cavity; the collapsible pyramid holographic projection imager is taken out from the support portion; the collapsible pyramid holographic projection imager is expanded and then placed in the cigarette packet accommodating cavity; and the image generation device is provided on the support portion.

11. The method according to claim 10, wherein in the simple multi-view naked-eye 3D cigarette packaging carton, there are two collapsible pyramid holographic projection imagers; and correspondingly, there are also two image generation devices.

12. The method according to claim 11, wherein in response to the displayed state of the cigarette packaging carton, a first one of the collapsible pyramid holographic projection imagers is fixed by the support portion, and suspended in the cigarette packet accommodating cavity in a forward pyramid form; and correspondingly, a first one of the image generation devices is provided on the support portion;

a second one of the image generation devices is provided at a bottom of the cigarette packet accommodating cavity, and a second one of the collapsible pyramid holographic projection imagers is provided on the second one of the image generation devices in an inverted pyramid form; and bottoms of the two collapsible pyramid holographic projection imagers are opposite to each other.

13. The method according to claim 12, wherein a gap is formed between the bottoms of the two collapsible pyramid holographic projection imagers.

14. The method according to claim 10, wherein in the simple multi-view naked-eye 3D cigarette packaging carton, the carton body comprises a front baffle, a rear baffle, a left baffle, and a right baffle; wherein the front baffle, the rear baffle, the left baffle, and the right baffle are connected sequentially; longitudinal grooves are respectively formed at four corners of the carton body; and four support legs of the frame are configured to be inserted into the grooves for fixing.

15. The method according to claim 14, wherein the front baffle, the rear baffle, the left baffle, and the right baffle are configured to be opened independently.

16. The method according to claim 14, wherein an image is further provided on each of the front baffle, the rear baffle, the left baffle, and the right baffle; and the image is configured to be interacted with the image of the collapsible pyramid holographic projection imager.

\* \* \* \* \*